US008970629B2

(12) United States Patent
Kim et al.

(10) Patent No.: US 8,970,629 B2
(45) Date of Patent: Mar. 3, 2015

(54) MOBILE TERMINAL AND 3D OBJECT CONTROL METHOD THEREOF

(75) Inventors: Jonghwan Kim, Incheon (KR); Mohammad Afroz Alam Khan, Bangalore (IN); Mohan Krishna Ranganathan, Bangalore (IN)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 13/313,203

(22) Filed: Dec. 7, 2011

(65) Prior Publication Data

US 2012/0229450 A1    Sep. 13, 2012

(30) Foreign Application Priority Data

Mar. 9, 2011    (KR) .................. 10-2011-0021107

(51) Int. Cl.
*G09G 5/00* (2006.01)
*G06F 3/0488* (2013.01)
*G06F 3/0481* (2013.01)

(52) U.S. Cl.
CPC .......... *G06F 3/0488* (2013.01); *G06F 3/04815* (2013.01)
USPC ........... 345/653; 345/649; 345/650; 345/651; 345/652; 345/654; 345/655; 345/660; 345/661; 345/662; 345/663; 345/664; 345/665; 345/666; 345/173

(58) Field of Classification Search
CPC ... G06F 3/0486; G06F 17/50; G06F 3/04865; G06T 19/00; G06T 2219/2016
USPC .......................... 345/649–655, 660–666, 173
See application file for complete search history.

(56) References Cited

U.S. PATENT DOCUMENTS

| 5,511,157 | A  | * | 4/1996  | Wang ............................. 345/652 |
| 5,977,982 | A  | * | 11/1999 | Lauzon .......................... 345/582 |
| 6,396,475 | B1 | * | 5/2002  | Ellenby et al. ................ 345/156 |
| 6,867,787 | B1 | * | 3/2005  | Shimizu et al. ............... 345/629 |
| 8,217,904 | B2 | * | 7/2012  | Kim ............................... 345/173 |
| 8,296,151 | B2 | * | 10/2012 | Klein et al. .................... 704/275 |
| 8,411,080 | B1 | * | 4/2013  | Zimmermann ............... 345/419 |
| 8,493,384 | B1 | * | 7/2013  | Reisman et al. .............. 345/419 |
| 2001/0050687 | A1 | * | 12/2001 | Iida et al. ..................... 345/581 |
| 2007/0008300 | A1 | * | 1/2007  | Yang et al. .................... 345/173 |
| 2007/0091119 | A1 | * | 4/2007  | Jezyk et al. ................... 345/619 |
| 2009/0315848 | A1 | * | 12/2009 | Ku et al. ........................ 345/173 |
| 2010/0313125 | A1 | * | 12/2010 | Fleizach et al. ............... 715/702 |
| 2011/0032330 | A1 | * | 2/2011  | Kim et al. ....................... 348/43 |
| 2011/0109617 | A1 | * | 5/2011  | Snook et al. .................. 345/419 |
| 2011/0148915 | A1 | * | 6/2011  | Kim ............................... 345/619 |
| 2011/0161843 | A1 | * | 6/2011  | Bennett et al. ............... 715/760 |
| 2012/0038625 | A1 | * | 2/2012  | Kim .............................. 345/419 |

* cited by examiner

*Primary Examiner* — Xiao M. Wu
*Assistant Examiner* — Todd Buttram
(74) *Attorney, Agent, or Firm* — KED & Associates LLP

(57) ABSTRACT

The present disclosure relates to a mobile terminal and a 3D object control method thereof for controlling the depth or rotation of a 3D object using a 3D manipulation portion displayed around the 3D object. According to the present invention, a circular- or ring-shaped 3D manipulation portion may be touched to intuitively control the rotation and enlargement/reduction of the 3D object, thereby providing usefulness and convenience for the user, capable of editing the 3D object while directly viewing the transformed form and depth of the 3D object.

22 Claims, 15 Drawing Sheets

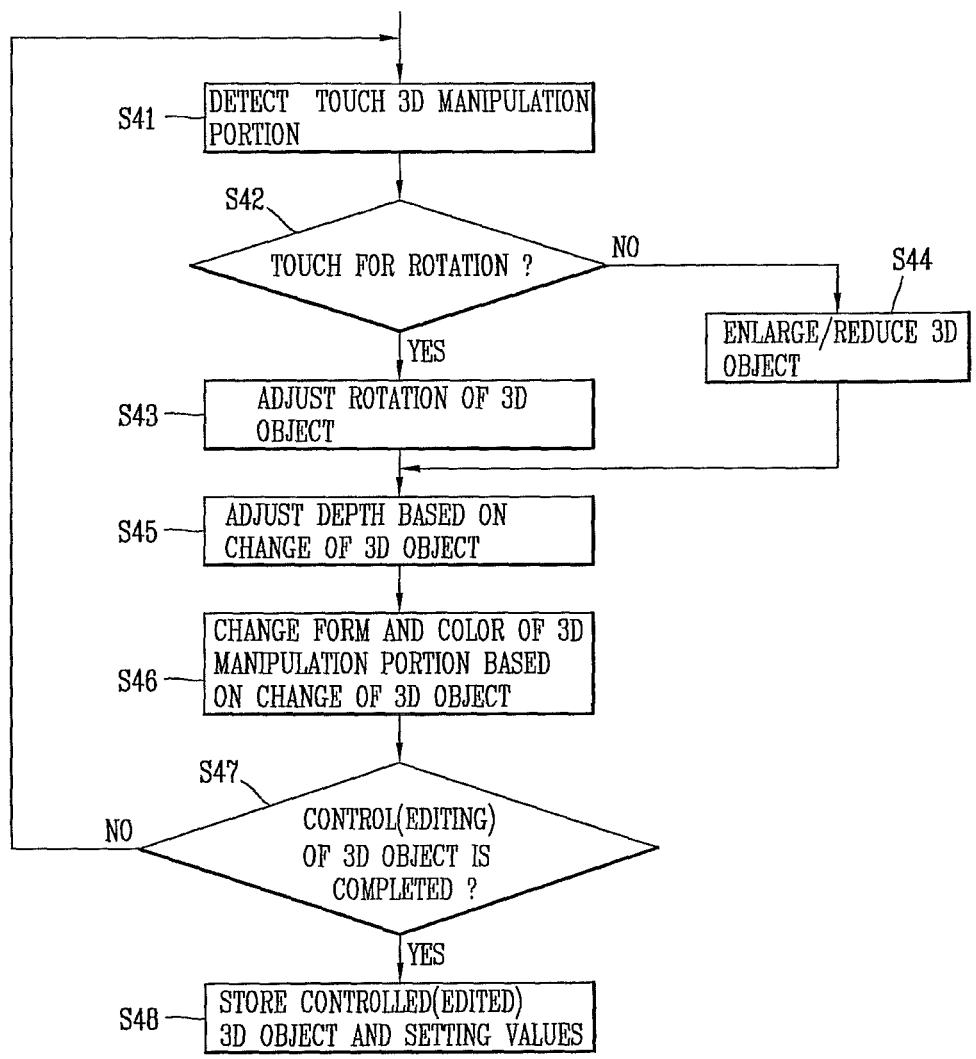

MOBILE TERMINAL AND 3D OBJECT CONTROL METHOD THEREOF

CROSS-REFERENCE TO RELATED APPLICATION(S)

Pursuant to 35 U.S.C. §119(a), this application claims the benefit of Korean Application No. 10-2011-0021107, filed on Mar. 9, 2011, the contents of which is incorporated by reference herein in its entirety.

BACKGROUND

1. Field

The present information relates to an image control method thereof, and more particularly, to a mobile terminal and a 3D object control method thereof capable of intuitively controlling the editing of a 3-dimensional (3D) object using a 3D manipulation portion.

2. Background

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal.

Of them, a touch function of the mobile terminal allows even users who are unskilled in a button/key input to conveniently perform the operation of a terminal using a touch screen. In recent years, it has settled down as a key function of the terminal along with a user UI in addition to a simple input. Accordingly, as the touch function is applied to a mobile terminal in more various forms, the development of a user interface (UI) suitable to that function is further required.

Recently released mobile terminals have been evolved to display 3-dimensional (3D) stereoscopic images, thereby allowing depth perception and stereovision exceeding the level of displaying two-dimensional images. Accordingly, the user can use more realistic user interfaces or contents through a 3-dimensional (3D) stereoscopic image.

However, when displaying the 3D image in a mobile terminal in the related art, if a size of the 3D image is suddenly changed to a great extent, then the depth of the image may be changed along therewith, thereby causing the considerable feeling of fatigue to the user's eyes when this situation persists for a long time.

Moreover, when the user displays a 3D image, the depth of the image may be typically fixed to an average value. However, even at the same depth of the image, it may vary depending on a viewing distance, age (adult or child), sex (male or female), hours of the day or a surrounding environment of the relevant 3D image reproduction, thereby resulting in varying fatigue.

However, a mobile terminal in the related art may simply display a 3D image and control the depth of the displayed 3D image, but cannot provide a user interface (UI) capable of actively performing the control related to the transformation and rotation of a 3D image from the standpoint of the user. In other words, although there is currently great interest in 3D images, it is the real situation that a user interface (UI) enjoyed by the user in a convenient manner has not been sufficiently provided.

SUMMARY OF THE INVENTION

Accordingly, an object of the present invention is to provide a mobile terminal and a 3D object control method thereof for providing a 3D manipulation portion capable of controlling the depth or rotation of a 3D object.

Another object of the present invention is to provide a mobile terminal and a 3D object control method thereof capable of controlling various transformation of a 3D object through a 3D manipulation portion and the depth of a 3D object corresponding to the transformation.

Still another object of the present invention is to provide a mobile terminal and a 3D object control method thereof in which the setting values of a 3D object through a 3D manipulation portion can be usefully used at the time of reediting.

In order to accomplish the foregoing tasks, there is provided a 3D object control method in a mobile terminal associated with an embodiment of the present invention, and the method may include displaying at least one 3-dimensional (3D) object; selecting a specific 3D object; displaying a 3D manipulation portion having a predetermined shape around the selected 3D object; and adjusting the rotation and depth of the 3D object according to a touch location and touch type of the 3D manipulation portion.

The 3D manipulation portion may be displayed when a specific 3D object is selected by any one of a long touch, a double touch, and a 3D hot key & touch.

The 3D manipulation portion may be displayed around a current 3D object, an enlarged 3D object, and a 3D object in a mini map, respectively.

The size of the 3D manipulation portion may be increased at the time of each multi-tapping.

The form and depth of the 3D object may be changed according to a touch location and touch type of the 3D manipulation portion, and the shape, color, and depth of the 3D manipulation portion may be also changed to correspond to the form and depth change of the 3D object.

The touch location of the 3D manipulation portion may include a touch to the 3D manipulation portion and a touch to an outer region of the 3D manipulation portion, and the touch type thereof may include a single-touch & drag and a multi-touch & drag.

The controller may rotate a 3D object in the relevant direction when part of the 3D manipulation portion is single-touched and then dragged in a predetermined direction on the basis of the central point, and adjust the depth while enlarging or reducing the relevant 3D object when an outer region of the 3D manipulation portion is touched and dragged to the inner side or outer side thereof.

The controller may adjust the depth while enlarging or reducing the relevant 3D object when the 3D manipulation portion is multi-touched or an outer region of the 3D manipulation portion is multi-touched and then widened or narrowed.

The controller may check whether or not there exists a prestored setting value in the relevant region when a predetermined 3D object is selected to automatically apply the relevant setting value to the 3D object when there exists one stored setting value, and display them as candidate setting values when there exist one or more stored setting values.

In order to accomplish the foregoing task, there is provided a mobile terminal associated with an embodiment of the present invention, the mobile terminal may include a display unit configured to display at least one 3-dimensional (3D) object; a controller configured to display a 3D manipulation portion having a predetermined shape around the relevant 3D object when a predetermined 3D object is selected, and adjust the rotation and depth of the 3D object according to a touch location and touch type of the 3D manipulation portion; and a memory configured to store a setting value of the 3D object for which the rotation and depth are adjusted.

The 3D manipulation portion may be formed to correspond to the form of the 3D object, and may have the shape of a circle, a band, and a ring displayed with the central axis.

The 3D manipulation portion may be generated and displayed when a 3D object is selected by any one of a long touch, a double touch, and a 3D hot key & touch.

The 3D manipulation portion may be displayed around a current 3D object, an enlarged 3D object, and a 3D object in a mini map to surround the relevant 3D object.

The size of the 3D manipulation portion may be increased at the time of each multi-tapping.

The form and depth of the 3D object may be changed according to a touch location and touch type of the 3D manipulation portion, and the shape, color, and depth of the 3D manipulation portion may be also changed to correspond to the form and depth change of the 3D object.

The touch location of the 3D manipulation portion may include a touch to the 3D manipulation portion and a touch to an outer region of the 3D manipulation portion, and the touch type thereof may include a single-touch & drag and a multi-touch & drag.

The controller may rotate a 3D object in the relevant direction when part of the 3D manipulation portion is single-touched and then dragged in a predetermined direction on the basis of the central point, and adjust the depth while enlarging or reducing the relevant 3D object when an outer region of the 3D manipulation portion is touched and dragged to the inner side or outer side thereof.

The controller may adjust the depth while enlarging or reducing the relevant 3D object when the 3D manipulation portion is multi-touched or an outer region of the 3D manipulation portion is multi-touched and then widened or narrowed.

The controller may check whether or not there exists a prestored setting value in the relevant region when a predetermined 3D object is selected to automatically apply the relevant setting value to the 3D object when there exists one stored setting value, and display them as candidate setting values when there exist one or more stored setting values.

BRIEF DESCRIPTION OF THE DRAWINGS

The embodiments will be described in detail with reference to the following drawings in which like reference numerals refer to like elements wherein:

FIG. 12 is a flow chart for adjusting the rotation and depth of a 3D object in FIG. 11.

DETAILED DESCRIPTION

Figure 1:
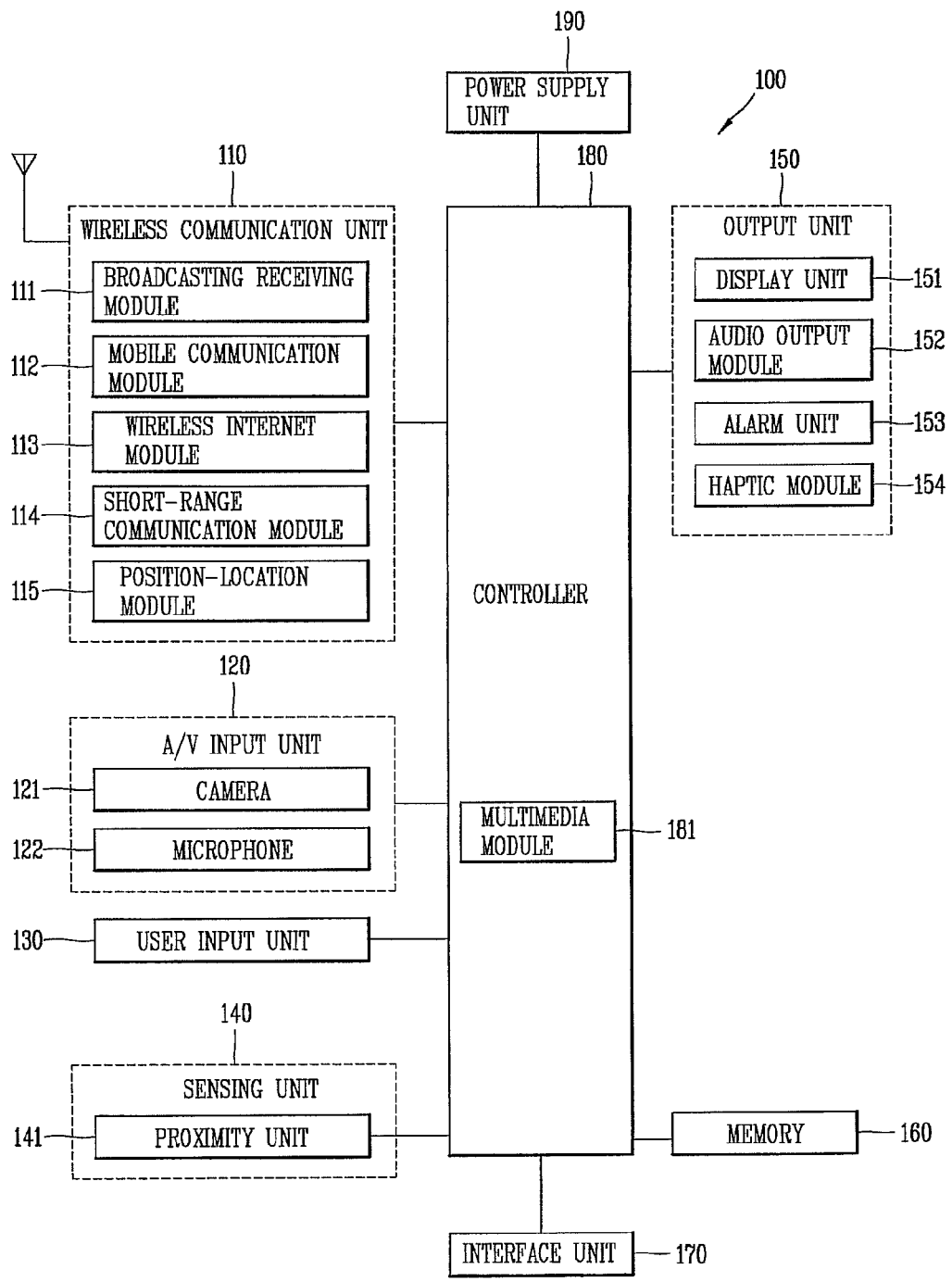
FIG. 1 is a block diagram illustrating a mobile terminal associated with an embodiment of the present invention.

Hereinafter, embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the embodiments disclosed herein, and therefore, they should not be construed to limit the technical spirit of the invention by the accompanying drawings.

A terminal disclosed herein may include a portable phone, a smart phone, a laptop computer, a digital broadcast terminal, a personal digital assistant (PDA), a portable multimedia player (PMP), a navigator, and the like. However, it would be easily understood by those skilled in the art that a configuration disclosed herein may be applicable to stationary terminals such as a digital TV, a desktop computer, and the like, excluding constituent elements particularly configured only for a mobile terminal.

FIG. 1 is a block diagram illustrating a mobile terminal 100 associated with an embodiment of the present invention.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to generate an output associated with visual sense, auditory sense, tactile sense, and the like, and the output unit 150 may include the display unit 151, an audio output module 153, an alarm unit 153, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a 3-dimensional (3D) display, and an e-ink display.

Some displays (or display elements) of them may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to an implementation type of the mobile terminal 100. For instance, a plurality of the display units 151 may be arranged on one surface to be separated from or integrated with each other, or may be arranged on different surfaces.

When the display unit 151 and a touch sensitive sensor (hereinafter, referred to as a touch sensor) have a layered structure with each other, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific portion of the display unit 151, or a capacitance generated at a specific portion of the display unit 151, into electric input signals. Also, the touch sensor may be configured to sense not only a touched position and a touched area, but also a touch pressure.

When there is a touch input to the touch sensor, the corresponding signal(s) are transmitted to a touch controller. The touch controller processes the received signals, and then transmits the corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or adjacent to the touch screen. The proximity sensor refers to a sensor for sensing presence or absence of an object approaching a surface to be sensed, or an object disposed adjacent to a surface to be sensed (hereinafter, referred to as a "sensing object"), by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of a pointer to the touch screen is sensed by changes of an electromagnetic field. In this case, the touch screen (touch sensor) may be categorized into a proximity sensor.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated by about 65 mm, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

According to the drawing, a left image and a right image required to implement a 3-dimensional stereoscopic image are displayed on the stereoscopic display unit 152 by a stereoscopic processing unit 152*a*. The stereoscopic processing unit 152*a* receives a 3D image to extract a left image and a right image from the 3D image, or receives a 2D image to convert it into a left image and a right image.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength, frequency or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound. For example, the ultrasound sensing unit 143 may be configured with an optical sensor and a plurality of ultrasound sensors.

The optical sensor may be formed to sense light. For example, the optical sensor may be an infrared data association (IRDA) for sensing infrared rays.

The ultrasound sensor may be formed to sense ultrasound waves. A plurality of ultrasound sensors are arranged to be separated from one another, and through this configuration, the plurality of ultrasound sensors may have a time difference in sensing ultrasound waves generated from the same or adjoining point.

Ultrasound waves and light are generated from a wave generating source. The wave generating source may be provided in the sensing object, for example, a stylus pen. Since light is far faster than ultrasound waves, the time for light to reach the optical sensor is far faster than the time for ultrasound waves to reach the optical sensor. Accordingly, the location of the wave generating source may be calculated by using a time difference between the light and ultrasound waves to reach the optical sensor.

The times for ultrasonic waves generated from the wave generating source to reach a plurality of ultrasonic sensors will be different. Accordingly, when moving the stylus pen, it will create a change in the reaching time differences. Using this, location information can be calculated according to the movement path of the stylus pen.

The camera sensing unit 144 may include at least one of a camera, a laser sensor, and a photo sensor.

For example, the camera and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes (PDs) and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various types of visual information may be displayed on the display unit 151. The visual information may be displayed in a form of characters, numerals, symbols, graphics, or icons, or may be implemented in 3-dimensional stereoscopic images.

For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way.

For example, an output window and an input window may be displayed on the upper portion and lower portion of the display unit, respectively. The output window and the input window may be regions allocated to output or input information, respectively. A soft key on which numerals for inputting phone numbers or the like are displayed is outputted on the input window. When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch input by scroll. The user may move an object displayed on the display unit 151, for example, a cursor or pointer placed on an icon, by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with a case where the display unit 151 (touch screen) and the touch pad are touched together within a predetermined period of time, one function of the mobile terminal 100 may be executed. As a case of being touched together, there is a case when the user clamps a terminal body of the mobile terminal 100 using the thumb and forefinger. For one of the functions executed in the mobile terminal 100, there may be an activation or de-activation for the display unit 151 or the touch pad.

Hereinafter, a mechanism for more precisely recognizing a touch input on a stereoscopic image in the mobile terminal 100 will be described in detail.

Figure 2A:
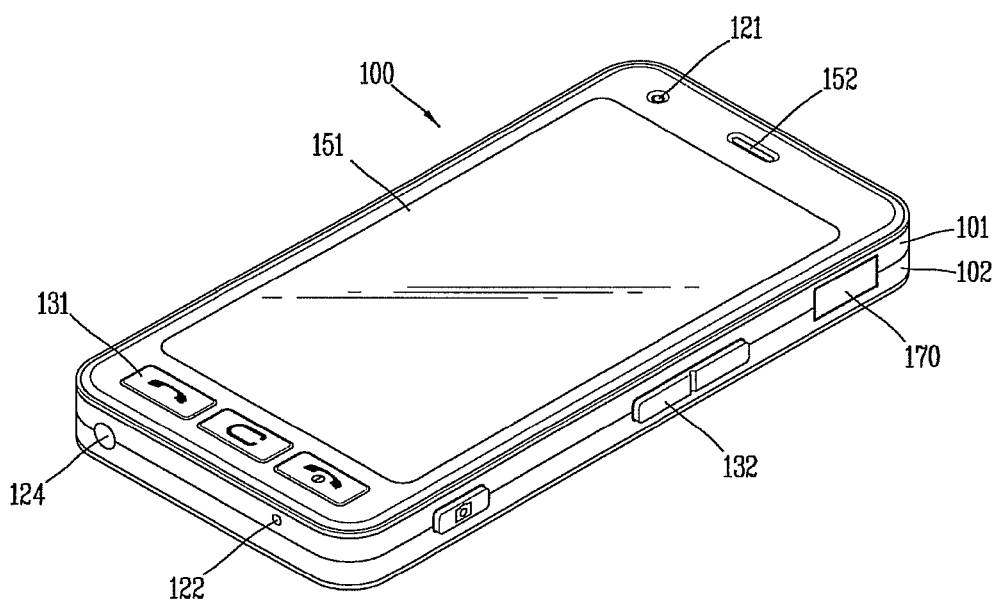
FIG. 2A is a front perspective view illustrating an example of the mobile terminal associated with the present invention.
Figure 2B:
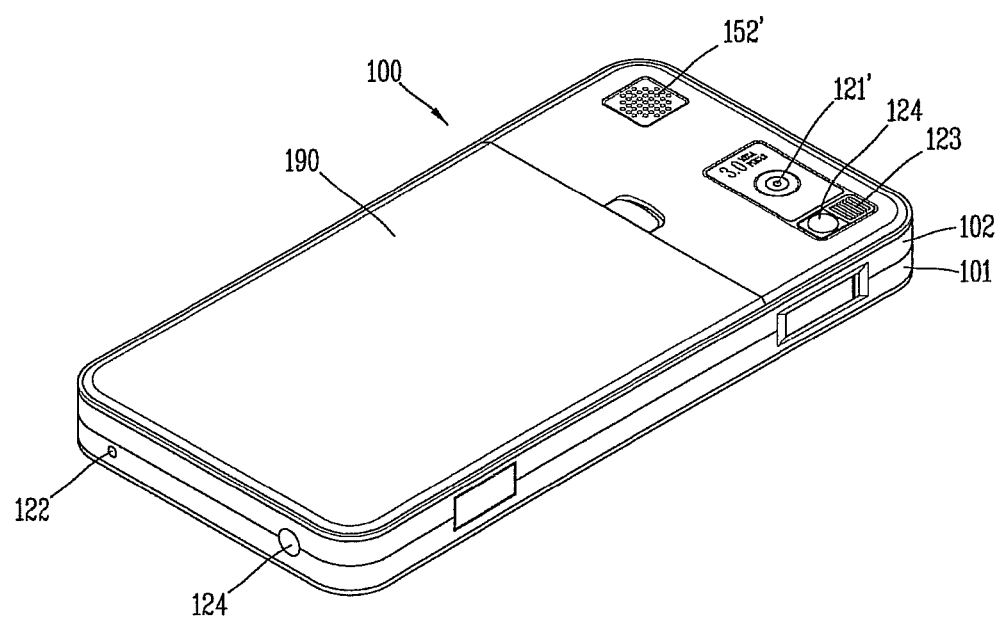
FIG. 2B is a rear perspective view illustrating the portable terminal illustrated in FIG. 2A.

FIG. 2A is a front perspective view illustrating an example of a mobile terminal associated with the present invention, and FIG. 2B is a rear perspective view illustrating the portable terminal illustrated in FIG. 2A.

The main terminal 200 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The body includes a case (casing, housing, cover, etc.) forming an appearance of the terminal. In this embodiment, the case may be divided into a front case 201 and a rear case 202. Various electronic elements are intergrated into a space formed between the front case 201 and the rear case 202. At least one middle case may be additionally disposed between the front case 201 and the rear case 202.

The cases may be formed by injection-molding a synthetic resin or may be also formed of a metal material such as stainless steel (STS), titanium (Ti), or the like.

A stereoscopic display unit 252, a sensing unit 240, an audio output module 253, a camera 221, a user input unit 230 (e.g., 231, 232), a microphone 222, an interface 270, and the like may be arranged on the terminal body, mainly on the front case 201.

The stereoscopic display unit 252 occupies a most portion of the front case 201. The audio output unit 253 and the camera 221 are disposed on a region adjacent to one of both ends of the stereoscopic display unit 252, and the user input unit 231 and the microphone 222 are disposed on a region adjacent to the other end thereof. The user interface 232 and the interface 270, and the like, may be disposed on lateral surfaces of the front case 201 and the rear case 202.

The user input unit 230 is manipulated to receive a command for controlling the operation of the portable terminal 200, and may include a plurality of manipulation units 231, 232. The manipulation units 231, 232 may be commonly designated as a manipulating portion, and any method may be employed if it is a tactile manner allowing the user to perform manipulation with a tactile feeling.

The content inputted by the manipulation units 231, 232 may be configured in various ways. For example, the first manipulation unit 231 may be used to receive a command, such as start, end, scroll, or the like, and the second manipulation unit 232 may be used to receive a command, such as controlling a volume level being outputted from the audio output unit 253, or switching into a touch recognition mode of the stereoscopic display unit 252. The stereoscopic display unit 252 forms a stereoscopic touch screen together with the sensing unit 240, and the stereoscopic touch screen may be an example of the user input unit 230.

The sensing unit 240, as a 3-dimensional sensor, may be configured to sensor a 3-dimensional location of the sensing object applying a touch. The sensing unit 240 may include a camera 221 and a laser sensor 244. The laser sensor 244 may be mounted on a terminal body to scan laser beams and detect reflected laser beams, and through this, thereby sensing a separation distance between the terminal body and the sensing object. However, the present invention will not be limited to this, and may be implemented in the form of a proximity sensor, a stereoscopic touch sensing unit, an ultrasound sensing unit, and the like.

Referring to FIG. 2B, a camera 221' may be additionally mounted on a rear surface of the terminal body, namely, the rear case 202. The camera 221' has an image capturing direction, which is substantially opposite to the direction of the camera 221 (refer to FIG. 2A), and may have different pixels from those of the camera 221.

For example, it is preferable that the camera 221 has a relatively small number of pixels enough not to cause a difficulty when the user captures his or her own face and sends it to the other party during a video call or the like, and the camera 221' has a relatively large number of pixels since the user often captures a general object that is not sent immediately. The cameras 221, 221' may be provided in the terminal body in a rotatable and popupable manner.

Furthermore, a flash 223 and a mirror 224 may be additionally disposed adjacent to the camera 221'. The flash 223 illuminates light toward an object when capturing the object with the camera 221'. The mirror 224 allows the user to look at his or her own face, or the like, in a reflected way when capturing himself or herself (in a self-portrait mode) by using the camera 221'.

An audio output unit may be additionally disposed on a rear surface of the terminal body. The audio output unit on a rear surface thereof together with the audio output unit 253 (refer to FIG. 2A) on a front surface thereof can implement a stereo function, and it may be also used to implement a speaker phone mode during a phone call.

Furthermore, a power supply unit 290 for supplying power to the portable terminal 200 may be mounted on the terminal body. The power supply unit 290 may be configured so as to be incorporated into the terminal body, or directly detachable from the outside of the terminal body.

A Bluetooth antenna, a satellite signal receiving antenna, a data receiving antenna for wireless Internet, and the like may be disposed on the terminal body in addition to an antenna for performing a phone call or the like. A mechanism for implementing the mobile terminal illustrated in FIG. 2 may be integrated into the terminal body.

Hereinafter, referring to FIG. 3, a communication system in which a terminal associated with the present invention can be operated will be described.

The communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like. Hereinafter, for the sake of convenience of explanation, the description disclosed herein will be limited to CDMA. However, the present invention may be also applicable to all communication systems including a CDMA wireless communication system.

Figure 3:
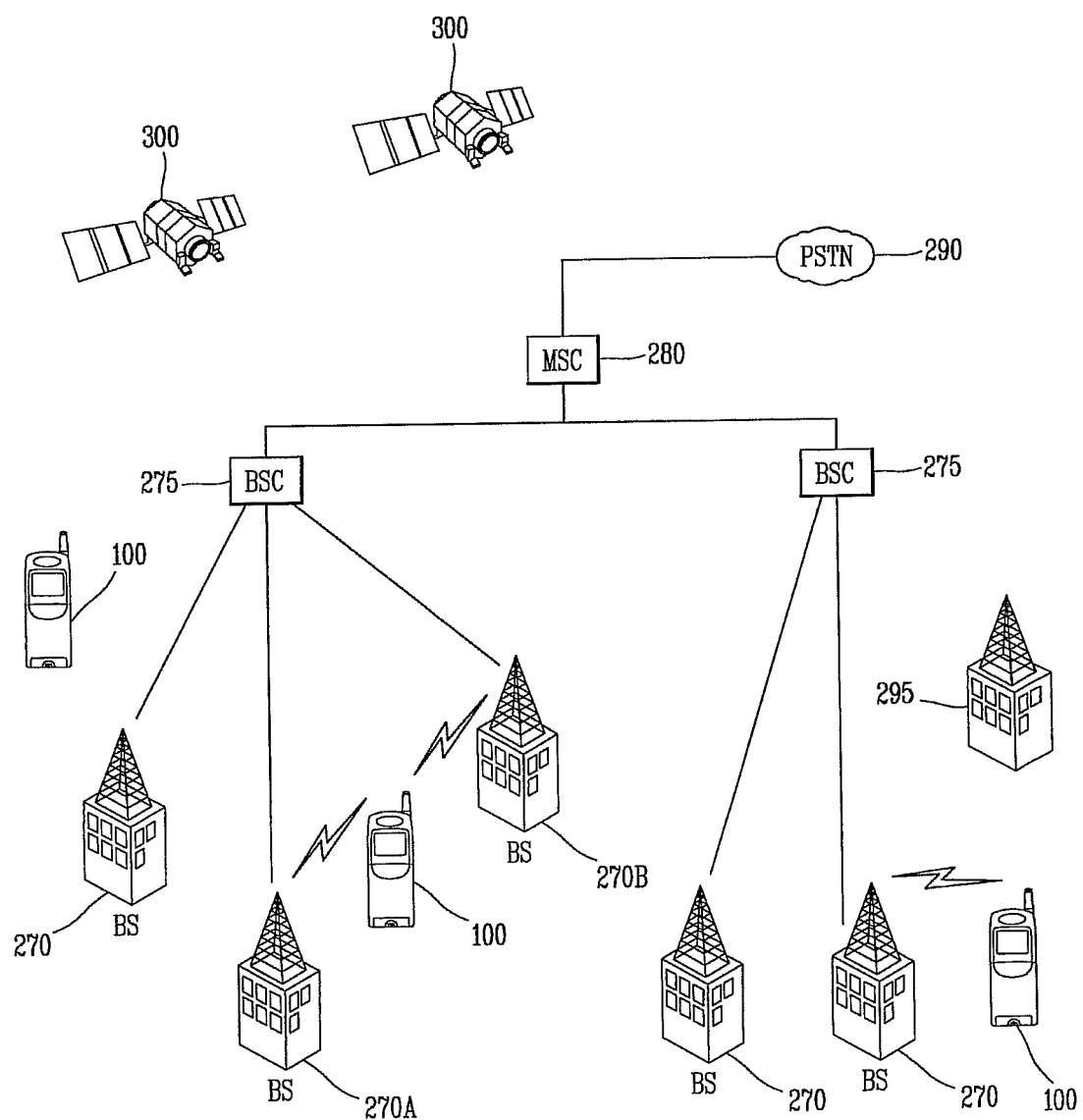
FIG. 3 is a block diagram illustrating a wireless communication system in which a mobile terminal associated with an embodiment of the present invention can be operated.

As illustrated in FIG. 3, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 4 may include a plurality of BSCs 275.

Each of the BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz).

The intersection of a sector and frequency assignment may be referred to as a CDMA channel. The BSs 270 may also be referred to as Base Station Transceiver Subsystems (BTSs). In this case, the term "base station" may refer collectively to a BSC 275, and at least one BS 270. The base stations may indicate cell sites. Alternatively, individual sectors for a specific BS 270 may also be referred to as a plurality of cell sites.

As illustrated in FIG. 3, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 3 illustrates several global positioning system (GPS) satellites 300. Such satellites 300 facilitate locating at least one of a plurality of mobile terminals 100. Though two satellites are illustrated in FIG. 3, location information may be obtained with a greater or fewer number of satellites. The location information module 115 as illustrated in FIG. 1 may cooperate with the satellites 300 to obtain desired location information. However, other types of position detection technology, all types of technologies capable of tracing the location may be used in addition to a GPS location technology. At least one of the GPS satellites 300 may alternatively or additionally provide satellite DMB transmissions.

During the operation of a wireless communication system, the BS 270 may receive reverse-link signals from various mobile terminals 100. At this time, he mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including systemization of soft handoffs between the base stations 270. The BSCs 275 may also transmit the received data to the MSC 280, which provides additional transmission services for interfacing with the PSTN 290. Similarly, the PSTN 290 may interface with the MSC 280, and the MSC 280 may interface with the BSCs 275. The BSCs 275 may also control the BSs 270 to transmit forward-link signals to the mobile terminals 100.

3-Dimensional (3D) Stereoscopic Image

In general, 3-dimensional stereoscopic image (hereinafter, abbreviated as a "3D image") is an image for allowing the user to feel the depth and reality of an object located on the monitor or screen similarly as in the real space. The 3-dimensional stereoscopic image may be implemented by using binocular disparity. Here, binocular disparity denotes a disparity made by two eyes separated apart from each other. Accordingly, the user is allowed to feel the depth and reality of a stereoscopic image when two eyes see different two-dimensional images and then the images are transferred through the retina and merged in the brain as a single image.

The 3D image may be displayed by a display method such as a stereoscopic method (glasses method), an auto-stereoscopic method (no-glasses method), a projection method (holographic method), and the like. The stereoscopic method may be primarily used in a home television receiver or the like and may include a Wheatstone stereoscopic method and the like. The examples of the auto-stereoscopic method may include a parallax barrier method and a lenticular method. In addition, the projection method may include a reflective holographic method, a transmissive holographic method, and the like.

Generation and Display of 3D Image

A 3D image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side-by-side method in which a left image and a right image are disposed at the left and right within a frame, a checker board method in which the pieces of a left image and a right image are disposed in a tile format, an interlaced method in which a left and a right image are alternately disposed for each column and row unit, and a time-sequential or frame-by-frame method in which a left image and a right image are alternately displayed for each time frame, according to the method of combining a left image and a right image into a 3-dimensional stereoscopic image.

Depth of 3D Image

Depth (or depth value) in a 3D image denotes an index indicating a 3-dimensional distance difference between objects within an image. The depth may be defined as 256 levels (maximum value 255– minimum value), which indicates a place close to the viewer or user as having a higher value. Accordingly, the meaning of adjusting the depth in a 3D image may represent that the 3D image is expressed as an original depth when it is displayed with an original size, and adjusted to a lower depth than the original one when the content is displayed with a smaller image.

For example, when the depth is defined to have 256 levels with maximum value 255 and minimum value 0, the depth is adjusted to 255 when the 3D image is displayed with an original size, and adjusted to a value less than 255 when it is displayed with a smaller image.

Generation and Display of 3D Manipulation Portion

According to the present invention, there is provided a scheme in which a 3D manipulation portion for performing 3D control to a 3D object is provided to control the depth, rotation, enlargement/reduction, shape/color, and the like of the 3D object, thereby enhancing the user's convenience.

A 3D object according to the present invention may include a picture, a widget, an image, and the like, and also include a text, an icon, and a graph shown on various screens, such as an idle screen, a phone call screen, an incoming call screen, a call setup screen, a call-making screen, a message screen, a phonebook screen, a call log screen, and the like, or various galleries or menus.

The 3D manipulation portion may be displayed (activated) when selecting a 3D object). If the 3D manipulation portion is activated and displayed, then a control mode for a 3D object transformation UI will be initiated.

The selection of the 3D object may include the detection of a predetermined motion by a motion sensor as well as a multi-touch or proximity touch. The multi-touch may include a double touch, a long touch, a 3D hot key & touch, and the like.

The 3D manipulation portion may be displayed to surround the 3D object, and may be displayed on a current 3D object, an enlarged 3D object, and a predetermined region (mini map). The 3D manipulation portion may be displayed to correspond to the 3D object, and typically has the form of a circular-shaped band or ring. When a 3D manipulation portion is displayed around (to surround) the 3D object, a menu for controlling the operation of the 3D object may be displayed. The menu may be located at an upper side or lower side of the selected 3D object.

The on/off, color, thickness, form, and operation scheme (depth, rotation angle) of the 3D manipulation portion may be set in the user menu.

The form and depth of the 3D object may be changed according to the manipulation of the 3D manipulation portion, and the shape, color, and depth of the 3D manipulation portion may be also changed in interlock with the form and depth change of the 3D object. In this case, according to the present invention, the rotation or depth change of the 3D object may be displayed through a display bar, a numeral, or an indicator.

Furthermore, according to the present invention, the depth and rotation angle of the 3D object may be controlled according to a touch type and touch location of the 3D manipulation portion. For example, the rotational direction, rotation angle, enlargement/reduction, and protrusion level of the 3D object may be controlled by touching part of the 3D manipulation portion or touching an outer region thereof.

In addition, the depth of the 3D object may be divided into several steps (for example, 7 steps) for the entire values (0-255). Accordingly, when the depth of the 3D object passes a boundary position of each step, the 3D manipulation portion may notify it to the user through a vibration or sound. Furthermore, when control to the 3D object through the 3D manipulation portion is disabled, for example, when further rotation or protrusion is disabled, it may be notified to the user.

The control result (editing result) of the 3D object through the 3D manipulation portion may be displayed on the screen, or displayed on the mini map in the form of a preview, and stored to be used later. When the controlled 3D object is stored, it may be stored to match the size or depth of the relevant 3D object. In this case, the editing result of the 3D object may be also automatically stored, and automatically applied to a recommendation value when editing the same region later.

Furthermore, according to the present invention, a setting value that has been applied to a 3D object may be reapplied to the same 3D object, and may be displayed at a side of the predetermined 3D object so to be applicable to another 3D object. The user may collectively apply the displayed plurality of setting values to the rotation angle or depth to one or a plurality of 3D objects.

Figure 4:
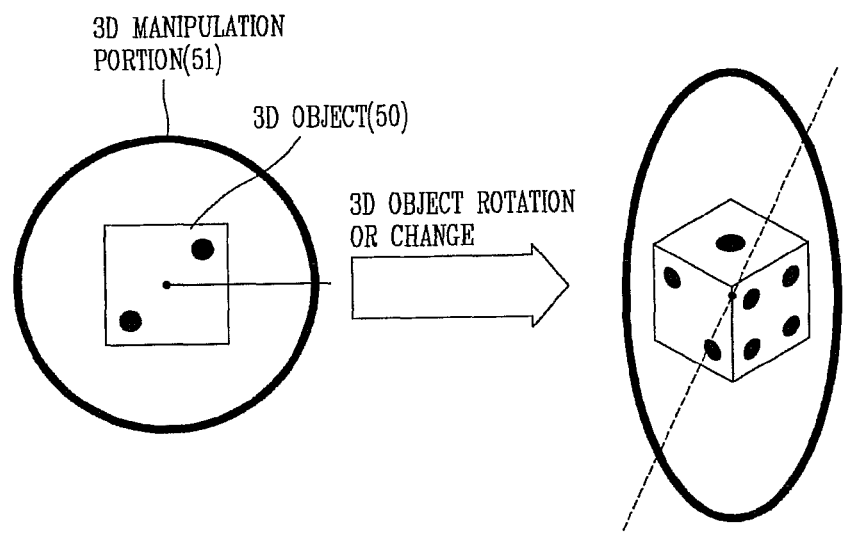
FIG. 4 is a view illustrating the concept of a 3D manipulation portion according to an embodiment of the present invention.

FIG. 4 is a view illustrating the concept of a 3D manipulation portion according to an embodiment of the present invention.

As illustrated in FIG. 4, a 3D object 50 may include a picture, an image, a widget, and the like, having the central axis. If the user selects the 3D object 50 by any one of a double touch, a long touch, and a 3D hot key & touch, then a 3D manipulation portion 51 may be displayed around the 3D object. The 3D manipulation portion 51 may be displayed in the form of a circular-shaped band or ring, and may be typically displayed to correspond to (match) the form of the 3D object.

Accordingly, the user may touch or multi-touch part of the 3D manipulation portion 51 on the basis of the central axis to rotate, enlarge or reduce the 3D object 50, and touch an outer region of the 3D manipulation portion 51 to adjust the depth (depth impression) of the 3D object. Hereinafter, a preferred embodiment of the present invention will be described.

Editing Operation Using 3D Manipulation Portion

Figure 5:
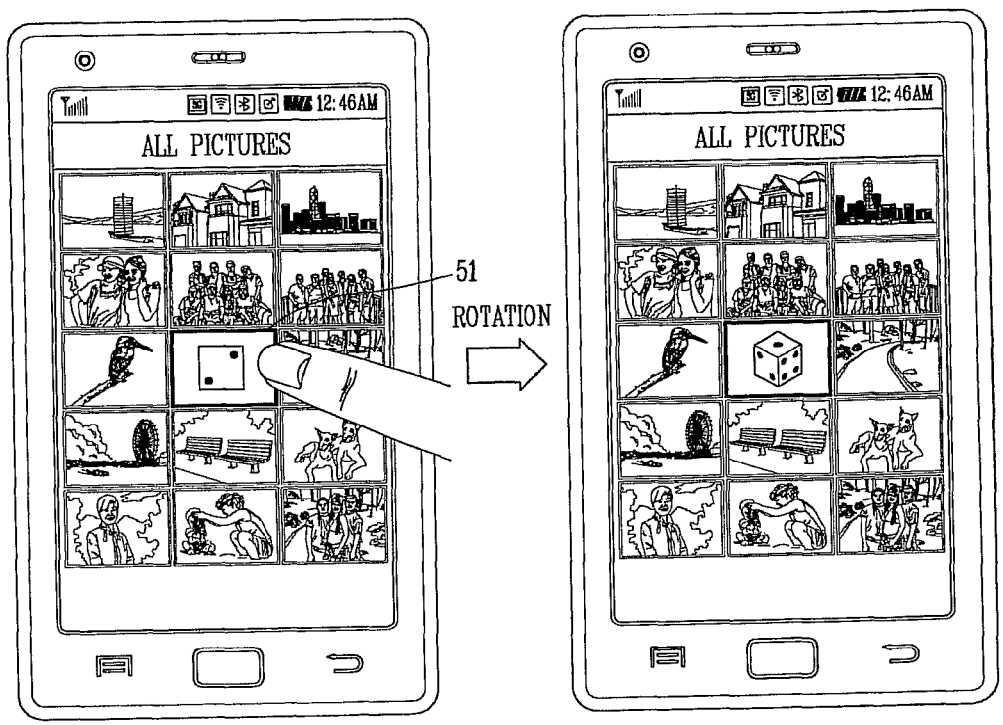
FIG. 5 is an example of a 3D object control method using a 3D manipulation portion in a mobile terminal according to an embodiment of the present invention.

FIG. 5 is an example of a 3D object control method using a 3D manipulation portion in a mobile terminal according to an embodiment of the present invention. In this case, for the sake of convenience of explanation, a picture may be taken as an example of the 3D object, and a rectangle may be taken as an example of the 3D manipulation portion to match the picture.

As illustrated in FIG. 5, a plurality of 3D objects (e.g. pictures) may be included in a gallery. If the user selects a specific 3D object by any one of a double touch, a long touch, and a 3D hot key & touch, then the controller 180 may display a rectangular 3D manipulation portion 51 around the relevant 3D object. At this time, the 3D manipulation portion 51 may be also displayed in a rectangular form because the shape of the 3D object included in the gallery is a rectangle. The user may configure the on/off, color, size, thickness, form, depth and rotation angle of the 3D manipulation portion 51 in advance, thereby allowing them to be changed during editing.

If the user touches or multi-touches part of the 3D manipulation portion 51 on the basis of the central point of the 3D manipulation portion 51 in a state of the 3D manipulation portion 51 being displayed to rotate, enlarge, or reduce the 3D object, then the controller 180 may display the rotated, enlarged, or reduced 3D object.

According to the present invention, when the 3D manipulation portion 51 is displayed around the selected 3D object, a control menu 52 for controlling the 3D object may be displayed for the sake of user's convenience.

Figure 6:
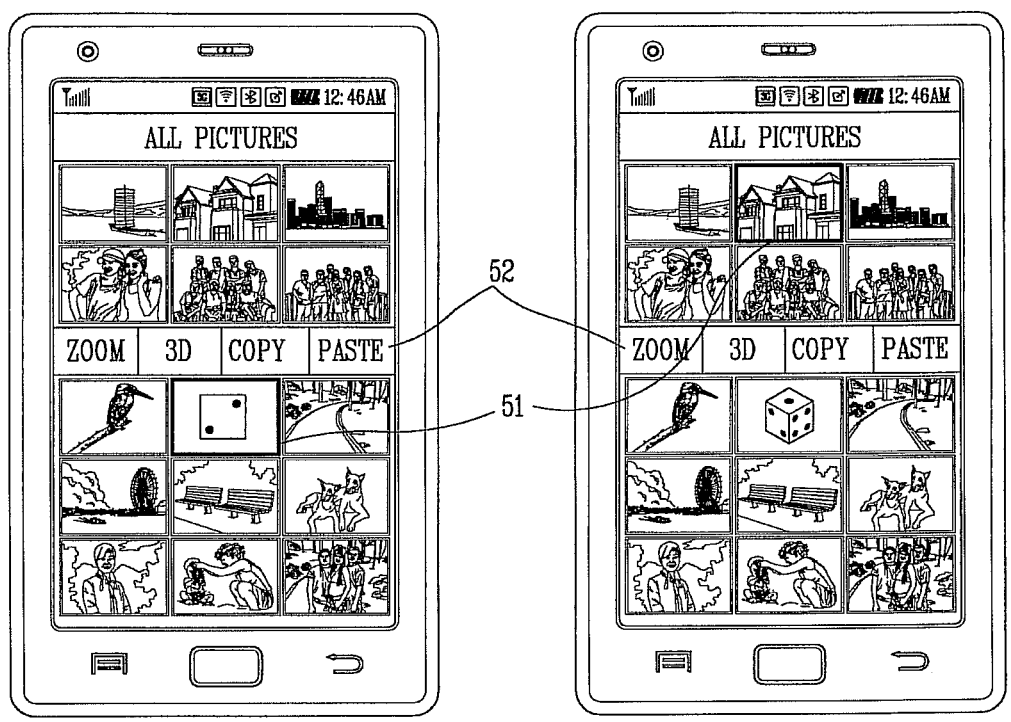
FIG. 6 is a view illustrating the displayed form of a control menu applied to an embodiment of the present invention.

FIG. 6 is a view illustrating the displayed form of a control menu applied to an embodiment of the present invention.

As illustrated in FIG. 6, if the 3D manipulation portion 51 is displayed, then the controller 180 may display a control menu along the location of the selected 3D object. In other words, the controller 180 may display the control menu 52 at an upper side of the 3D manipulation portion 51, but the control menu 52 may be displayed at a lower side of the 3D manipulation portion 51 when the 3D object at the highest position. The control menu may include zoom, 3D, copy, and paste (insertion).

According to the present invention, when a plurality of 3D objects 50 are arranged densely as in a gallery, if a predetermined 3D object is selected from the gallery, then the relevant 3D object may be automatically enlarged and displayed together with the 3D manipulation portion 51. When it is set in advance by the user, or the size of the 3D object 50 is less than a predetermined size, or the number of 3D objects is greater than a predetermined value, the automatic enlargement may be automatically carried out by the controller 180.

Figure 7A:
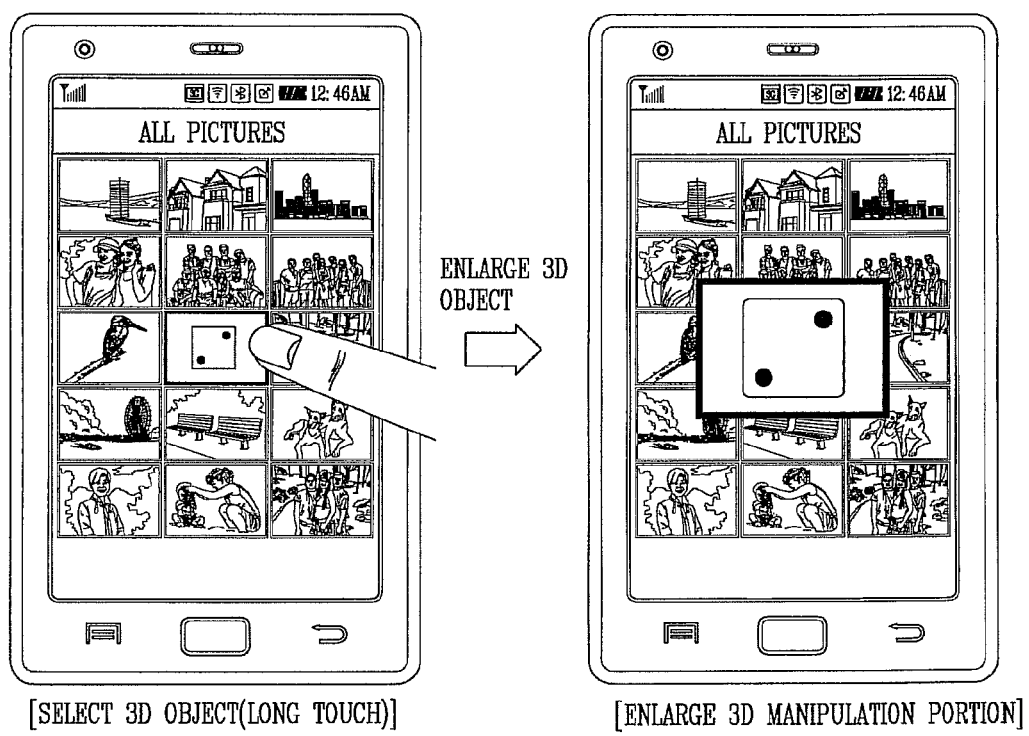
FIGS. 7A and 7B are views illustrating an enlarged form of the 3D object displayed with a 3D manipulation portion in the surrounding thereof according to an embodiment of the present invention.
Figure 7B:
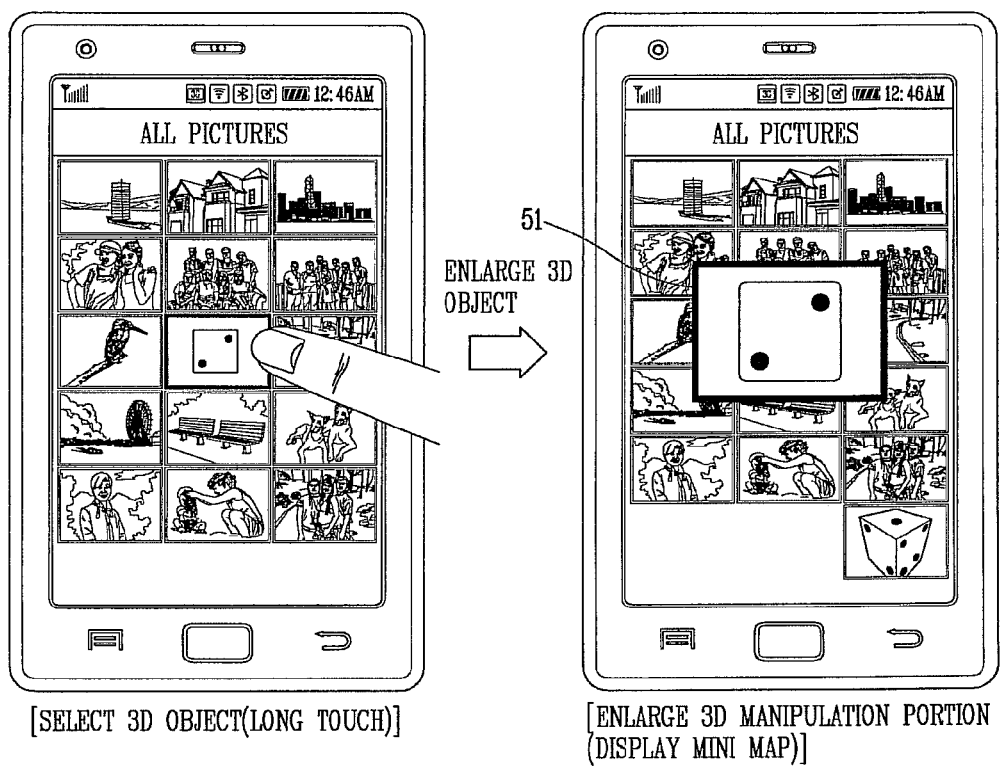

FIGS. 7A and 7B are views illustrating an enlarged form of the 3D object having a 3D manipulation portion when the 3D object is selected. FIG. 7A is an example in which the selected 3D object is enlarged and displayed at the center of the screen, and FIG. 7B is an example in which a mini map 52 is displayed at the center of the screen to display an editing state of the 3D object at a side thereof while the 3D object being enlarged and displayed. In this case, the enlarged 3D object and 3D manipulation portion may have a depth greater than the other 3D objects.

In particular, according to the embodiment illustrated in FIG. 7B, when the selected 3D object is enlarged and displayed at the center of the screen, the size of the other 3D objects may be reduced, thereby displaying a mini map 52 in a region created by reducing the other objects.

According to another embodiment of the present invention, when a 3D object is selected, the 3D object having the 3D manipulation portion 51 may be enlarged to a predetermined size to be displayed on a separate screen.

Accordingly, the user may perform an editing operation (enlargement/reduction, rotation, depth control) using the 3D manipulation portion 51. For example, if the 3D manipulation portion 51 is touched and dragged in a predetermined direction, then the controller 180 may rotate the 3D object to change the shape of the 3D object, and also change the shape of the 3D manipulation portion 51 to match the changed form of the 3D object. Furthermore, if the 3D object is enlarged/reduced by the 3D manipulation portion 51 to change the depth of the 3D object, then the controller 180 may apply the same depth even to the 3D manipulation portion 51 and display the depth change with a color.

Figure 8:
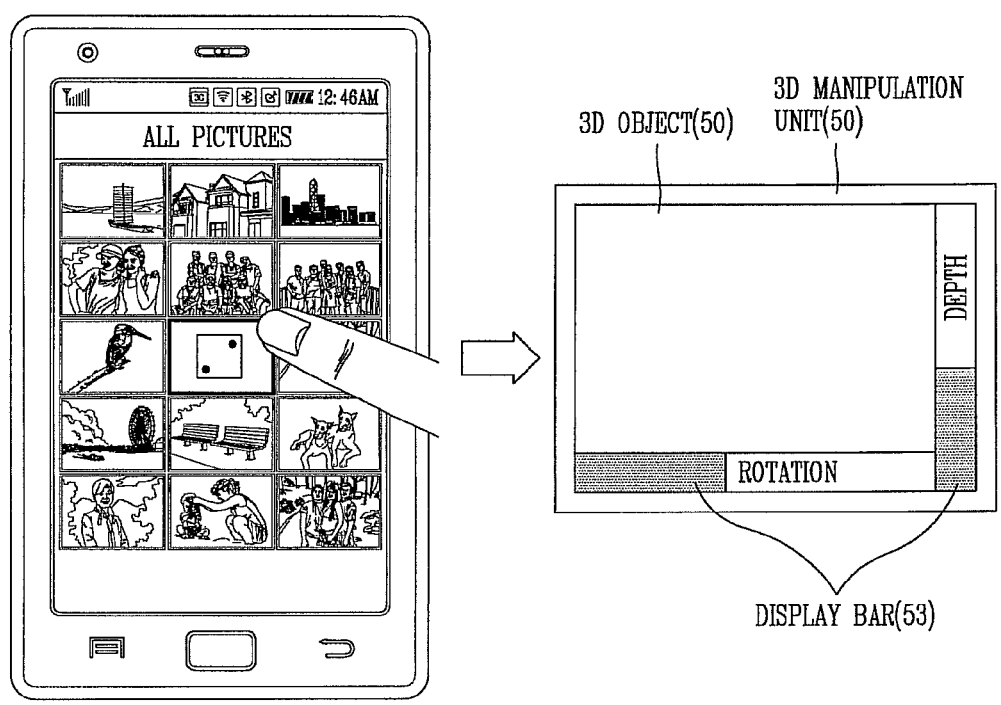
FIG. 8 is a view illustrating an example of a display bar for displaying the rotation and depth of a 3D object according to the present invention.
Figure 9A:
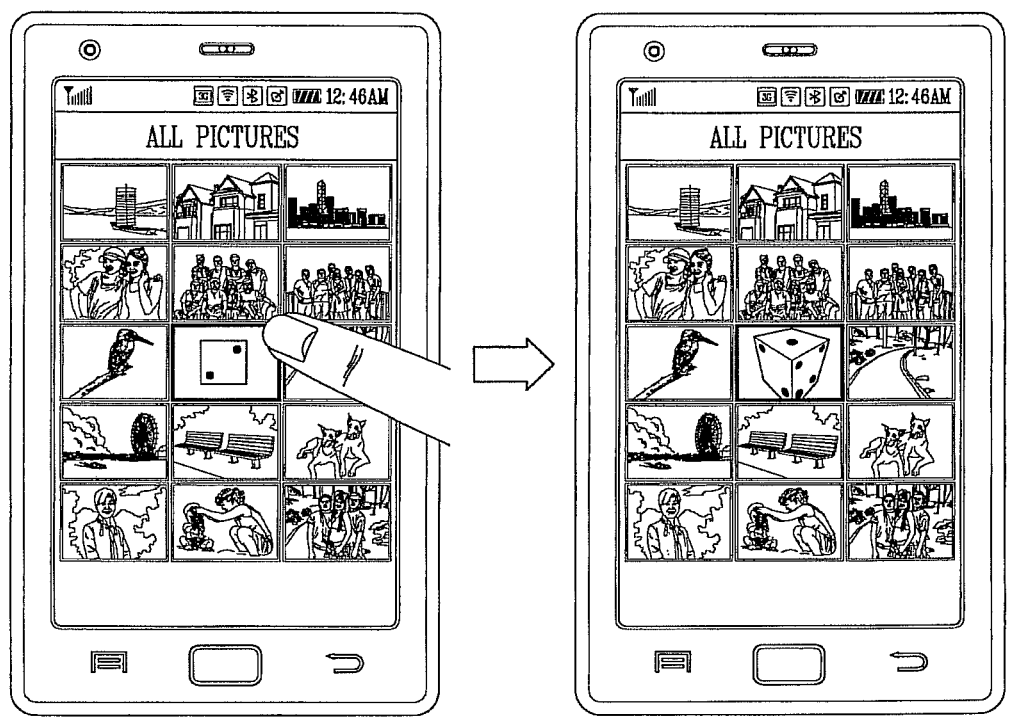
FIG. 9a through 9D are views illustrating the transformation of a 3D object according to a touch location and touch type of the 3D manipulation portion.
Figure 9B:
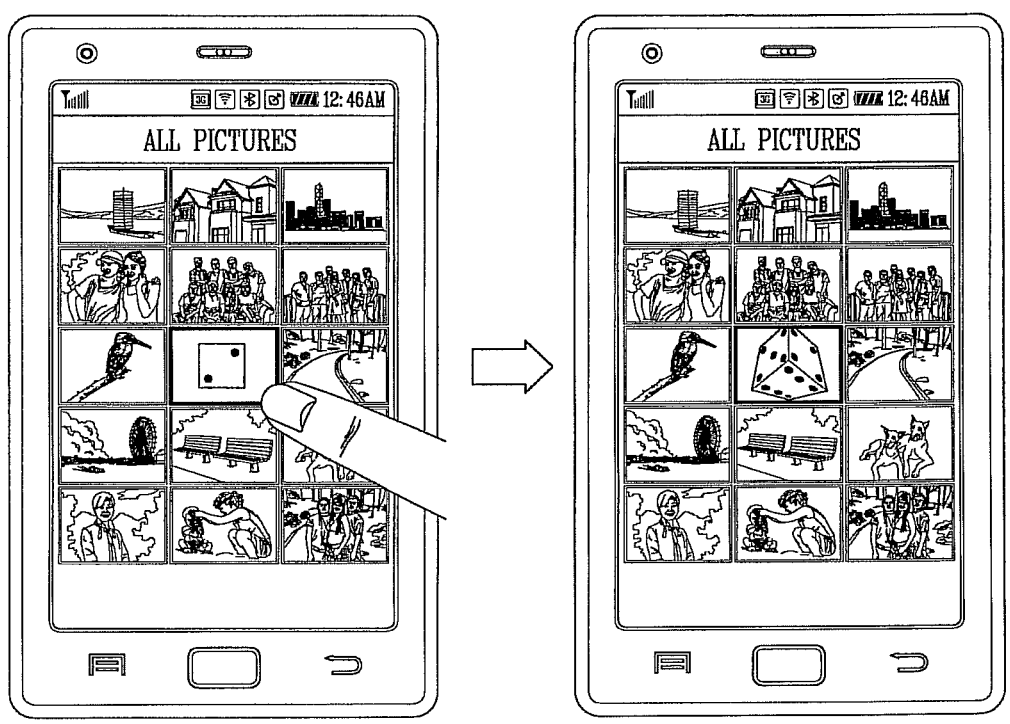
Figure 9C:
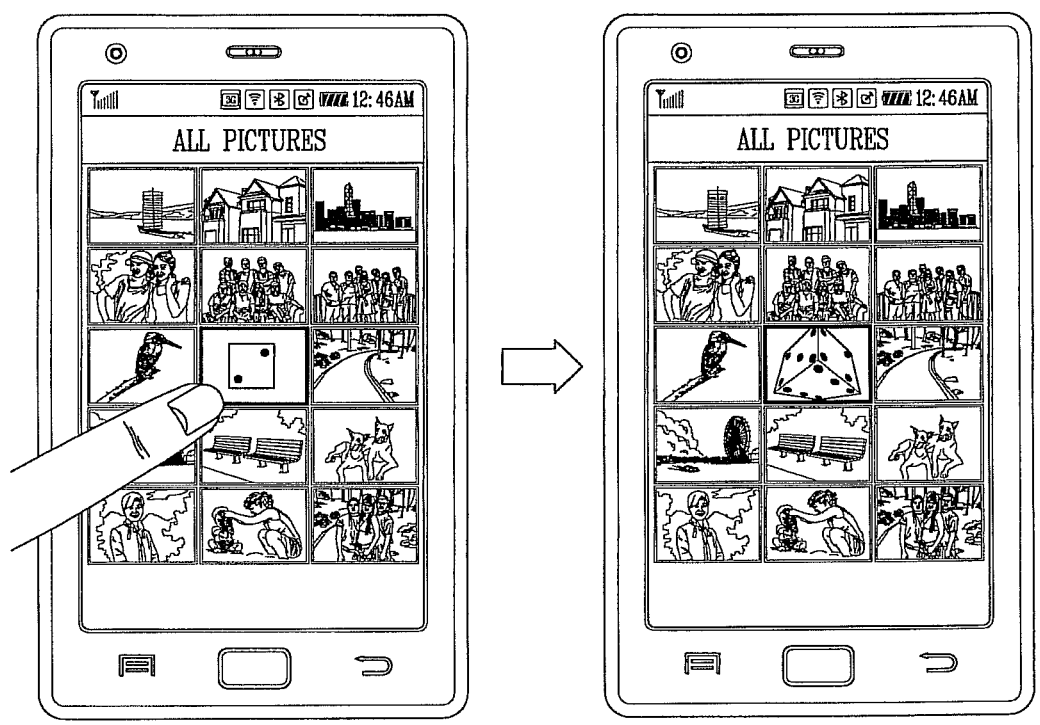
Figure 9D:
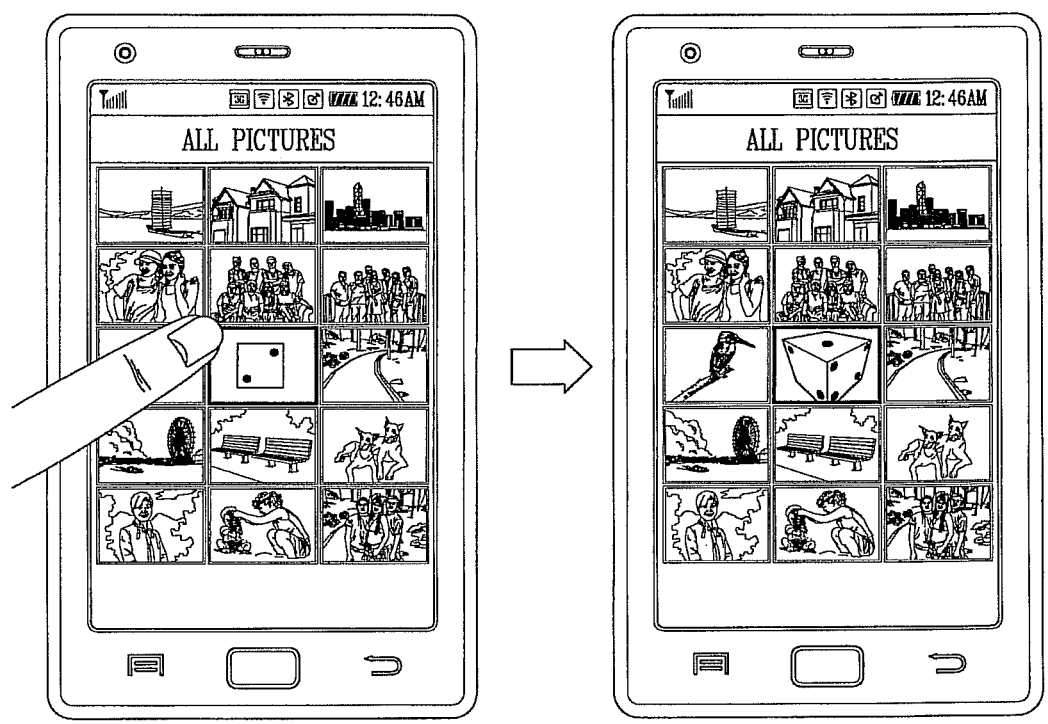

In particular, according to the present invention, display bars 53 for indicating the rotation angle and depth of the 3D object, respectively, may be provided at a side of the 3D manipulation portion 51 as illustrated in FIG. 8, thereby allowing the user to easily find a depth change based on the rotation of the 3D object. In this case, the depth may be displayed by dividing values 0-255 into a predetermined step (7 steps), and if each step is changed or the 3D object passes a boundary region of the bar, then it may be notified to the user.

In addition, according to the present invention, the rotation angle and depth of the 3D object may be displayed through a numeral or color as well as displayed through a display bar.

Hereinafter, the editing operation of the 3D object through the 3D manipulation portion 51 will be described as follows.

FIG. 9a through 9D are views illustrating the transformation of a 3D object according to a touch location and touch type of the 3D manipulation portion. In other words, according to the foregoing embodiments, it is illustrated that the shape and depth of the 3D object are controlled based on the location at which the 3D manipulation portion is rotated on the basis of the central point. The controlled 3D object may be displayed in real time on the screen or may be displayed in the form of a mini map. It may be summarized as follows.

Touch location of the 3D manipulation portion
    Touch 3D manipulation portion (touch part thereof)
    Touch an outer portion of the 3D manipulation portion
    Touch type of the 3D manipulation portion
    Single touch & drag
    Multi-touch & drag Accordingly, when the user touches the 3D manipulation portion, the form and depth of the 3D object may be determined by a touch location and touch type of the 3D object.

In other words, if the user touches (single-touch) part of the 3D manipulation portion 51 and then drags it in a predetermined direction on the basis of the central point, then the relevant 3D object may be rotated. In this case, the rotational direction may be determined based on the touch location of the 3D manipulation portion as illustrated in FIG. 9A through 9D.

On the contrary, if the user touches an outer region of the 3D manipulation portion 51 to drag it in an inward or outward direction, then the 3D object may be protruded inward or outward. In this case, the depth may be adjusted by a level of being protruded inward or outward.

Furthermore, if the user multi-touches the 3D manipulation portion 51 and then drags it in a predetermined direction on the basis of the central point, then the relevant 3D object may be rotated. In addition, if the 3D manipulation portion 51 is multi-touched by the user and then widened or narrowed, then the relevant 3D object may be protruded outward or inward while being enlarged or reduced, and the depth of the 3D object may be adjusted based on a level of being protruded inward or outward.

On the contrary, if an outer region of the 3D manipulation portion 51 is multi-touched by the user and then narrowed or widened, then the relevant 3D object may be protruded inward or outward.

In this manner, according to the present invention, the rotation angle and depth of the 3D object may be adjusted according to a touch location and touch type of the 3D manipulation portion. However, the rotation or enlargement/reduction of the 3D object through the 3D manipulation portion cannot be carried out in an unlimited manner, but has a predetermined threshold value.

Accordingly, when the level of being protruded outward or inward cannot be rotated any longer or cannot be adjusted by enlarging/reducing the 3D object through the 3D manipulation portion, the controller 180 may notify it to the user through a vibration, a sound or an indicator.

Furthermore, as described above, the size, color and shape of the 3D manipulation portion 51 may be set in the user menu, but may be also directly controlled by a touch while editing the 3D object. For example, the size of the 3D manipulation portion 51 may be increased at the timing of each multi-tapping, and if the size has been set, then the set size may be automatically applied thereto when displaying it again.

Storage of the Edited 3D Object

As described above, the user may apply a touch location and touch type of the 3D manipulation portion in a different manner to adjust the rotation angle and depth to a 3D object, thereby performing an editing operation to the 3D object. Once the editing operation to a 3D object has been completed, then the relevant 3D object may be stored in the memory 160 according to the user's instruction.

In this case, if the 3D manipulation portion is touched by the user and then dragged in an outward direction or a storage menu is selected in the user menu, then the controller 180 may recognize it as a storage operation to store a currently edited 3D object in a predetermined region of the memory 160. At this time, the 3D object being stored may be stored subsequent to removing the 3D manipulation portion, and in particular, when edited for enlargement, it may be stored in its original size.

Furthermore, when the 3D object is inserted into part of the picture, it may be automatically adjusted to match the depth or rotation angle of a portion being inserted, and in case of a widget, it may be applied to match the size or depth angle of the relevant widget on an idle screen.

Application of the Stored 3D Object

Figure 10A:
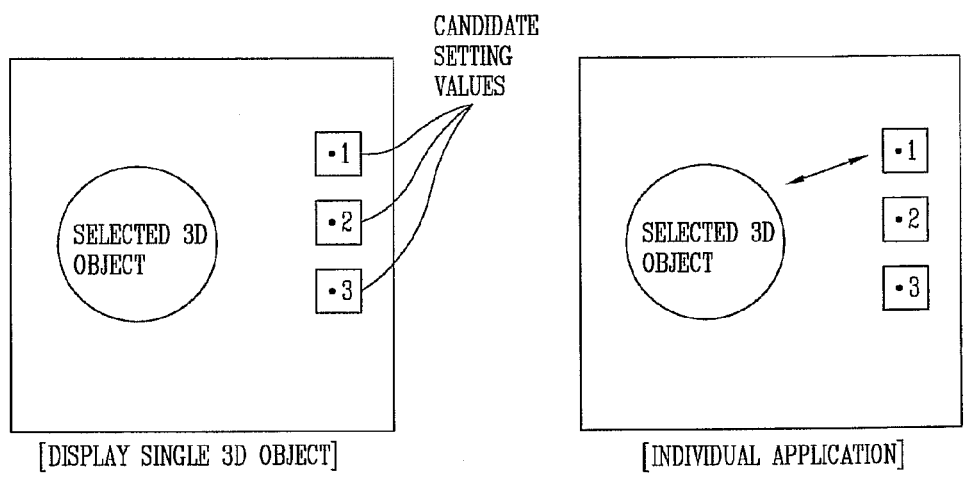
FIGS. 10A and 10B are views illustrating an example of the transformation pattern of a 3D object according to an embodiment of the present invention.
Figure 10B:
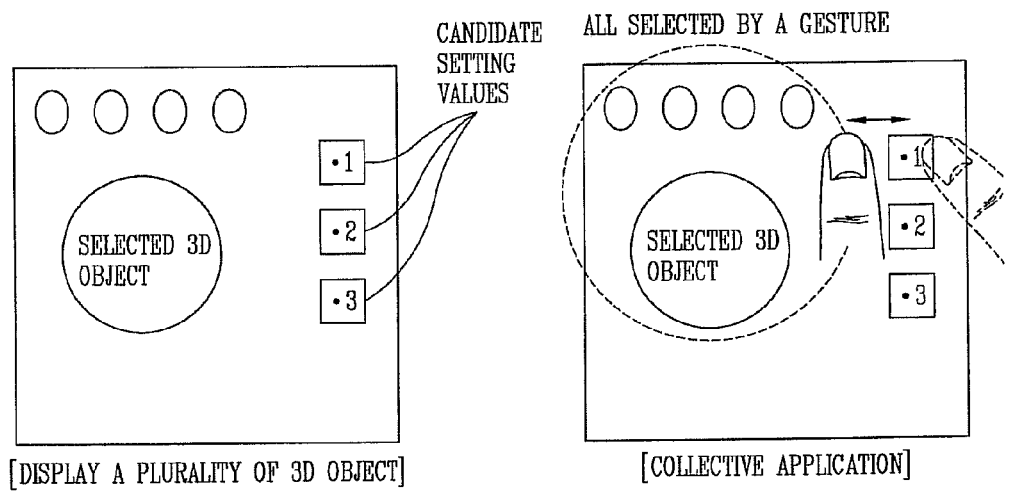

FIGS. 10A and 10B are views illustrating an example of the transformation pattern of a 3D object according to an embodiment of the present invention. The foregoing method illustrates an example of using a prestored setting value when editing a 3D object in a specific region having an edited history.

As illustrated in FIG. 10A, the controller 180 may check whether or not a region currently being displayed with a 3D object has been previously edited, and if there exists a setting value that has been previously stored, then the controller 180 automatically may apply the relevant setting value to the 3D object. In addition, when there exist one or more stored setting values, they may be displayed as candidate setting values to allow the user to select them. The candidate setting values may be displayed in the order of the most recently used setting values (1), the types of contents (2), and categories (3) and the most frequently used.

Accordingly, if the user touches the relevant 3D object and then drags and drops to one of the candidate setting values, then the controller 180 may apply its prestored candidate value to the 3D object.

FIG. 10B illustrates an example of performing an editing operation to a plurality of 3D objects and then collectively applying a prestored setting value.

The user may select a plurality of 3D objects included in the same region on the screen (when a plurality of pictures are overlapped) and then perform an editing operation to the relevant 3D objects. If the editing operation has been completed, then the controller 180 may automatically apply a prestored setting value (collective application), or a plurality of 3D objects may be all selected (3D object group) by a touch gesture and then one setting value may be dragged and dropped to the selected 3D object group to collectively apply a specific setting value to the plurality of 3D objects.

In this manner, according to the present invention, when a transformation pattern created through the 3D manipulation portion is stored and then a 3D editing is carried out again for the same region, the editing operation may be easily carried out by using the stored 3D object pattern.

Figure 11:
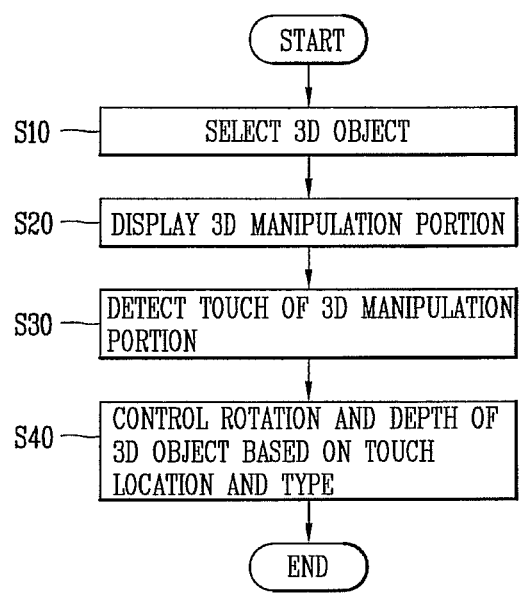
FIG. 11 is a flow chart illustrating a 3D object control method in a mobile terminal according to an embodiment of the present invention.

FIG. 11 is a flow chart illustrating a 3D object control method in a mobile terminal according to an embodiment of the present invention.

As illustrated in FIG. 11, the user may select a 3D object 50 to be edited (S10).

The 3D object 50 may include a widget on the initial screen as well as a picture, an image, and the like included in a gallery, and may include a text, an icon, and a graph shown on various screens, such as an idle screen, a phone call screen, an incoming call screen, a call setup screen, a call-making screen, a message screen, a phonebook screen, a call log screen, and the like, or various galleries or menus.

The 3D object 50 may be selected by a double touch, a long touch, a 3D hot key & touch, and the like. If one 3D object 50 is selected to be enlarged and displayed on the display unit 151, then the controller 180 may display a circular-shaped 3D manipulation portion 51 around the selected 3D object 50 (S20).

The shape of the 3D manipulation portion may be formed to correspond to the form of the 3D object 50, and typically has the form of a circular-shaped band or ring. Furthermore, the controller 180 may display a menu (zoom, 3D, copy, paste) for editing the 3D object 50 around the 3D manipulation portion 51.

If the 3D manipulation portion 51 is displayed, then the controller 180 may enter an 3D object control mode to detect the user's touch input for controlling the relevant 3D object 50 (S30). The touch input may be determined according to what type of touch on which region of the 3D manipulation portion 51 has been made by the user. The touch location may be divided into a region of the 3D manipulation portion 51 and a region of an outer region of the 3D manipulation portion 51, and the type of touch may be divided into a single-touch & drag and a multi-touch & drag.

Accordingly, the controller 180 may perform an editing operation to a 3D object, namely, rotation and enlargement/reduction to the 3D object 50 (transformation) according to the determined touch location and region, and in accompaniment with this, adjust the form and color of the 3D manipulation portion 51 to match the transformed 3D object while adjusting the depth of the 3D object 50 (S40).

FIG. 12 is a flow chart for adjusting the rotation and depth of a 3D object in FIG. 11.

If entering a 3D object control mode, then the controller 180 may determine a location and type of the user's touch input to the 3D manipulation portion 51 (S41). In other words, the controller 180 may determine whether the user touches part of the 3D manipulation portion 51 or touches an outer region of the 3D manipulation portion 51, and determine whether the touch on the relevant region is a single-touch & drag or multi-touch & drag (S42).

As a result of the determination, if the user's touch input is a touch for rotation, in other words, if part of the 3D manipulation portion 51 is touched (single touch) and then dragged in a predetermined direction on the basis of the central point thereof, then the controller 180 may rotate the 3D object 50 in the relevant direction (S43). Furthermore, if the user multi-touches the 3D manipulation portion 51 and then drags it in a predetermined direction on the basis of the central point thereof, then the controller 180 may rotate the relevant 3D object.

On the contrary, if the user's touch input is a touch for enlargement/reduction of the 3D object, namely, if an outer region of the 3D manipulation portion 51 is touched and dragged to the inner side or outer side thereof, then the controller 180 may transform the 3D object 50 to be protruded inward or outward (S44).

In addition, if the 3D manipulation portion 51 is multi-touched and then widened or narrowed by the user, then the controller 180 may control the relevant 3D object 50 to be protruded inward or outward while being enlarged or reduced. In this case, the controller 180 may adjust the depth of the 3D object 50 based on a level of being protruded inward or outward, and the control state may be displayed in the form of a preview on the screen or a separate mini map.

If the 3D object 50 is rotated or enlarged/reduced to adjust the depth according to a location and type of the user's touch, then the controller 180 may display the color, thickness and shape of the 3D manipulation portion 51 in a different manner, and display the 3D manipulation portion in the same depth as that of the adjusted 3D object 50 according to the transformation of the 3D manipulation portion 51 (S46). More specifically, the depth of the 3D object 50 may be increased or decreased in proportion to a reduction/enlargement ratio.

Then, the controller 180 may check whether the control operation of the relevant 3D object 50 has been completed (S47), and it may be returned to step S41 if not completed, and the controlled setting value of the 3D object 50 may be stored in the memory 160 if completed (S48).

In this manner, according to the present invention, the rotation angle and depth to a 3D object may be adjusted according to a touch location and touch type of the 3D manipulation portion, and a setting value of the adjusted 3D object may be stored in the memory. Furthermore, the controller 180 may display the 3D object edited to be enlarged by the 3D manipulation portion by restoring it to the original size and depth of the gallery while storing the setting value of the 3D object in the memory 160.

As described above, according to the present invention, a circular- or ring-shaped 3D manipulation portion may be provided around a 3D object to intuitively control the 3D object, and thus the rotation and enlargement/reduction of the 3D object can be controlled by manipulating the 3D manipulation portion, thereby allowing the user to conveniently edit the 3D object while directly viewing the transformed form and depth change.

Furthermore, according to an embodiment of the present invention, the foregoing method may be implemented as codes readable by a computer on a medium written by the program. Examples of the computer-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing terminal, and all or part of each embodiment may be selectively combined and configured to make various modifications thereto. Accordingly, the configuration illustrated in the embodiments disclosed herein and the drawings is merely the most preferred embodiment of the present invention, and is not intended to represent all the technical spirit of the present invention, and thereby it should be appreciated that there may exist various equivalents and modifications for substituting those at the time of filing this application.

What is claimed is:

1. A display method of a mobile terminal, the method comprising:
   displaying at least one perceived 3-dimensional (3D) object on a display;
   selecting a specific 3D object from the display by one of a long touch, a double touch, or a 3D hot key & touch;
   in response to the selecting of the specific 3D object by one of the long touch, the double touch, or the 3D hot key & touch, displaying, on the display, a 3D manipulation portion having a predetermined shape along the selected 3D object's edge;
   detecting a touch input within the displayed 3D manipulation portion; and
   adjusting a rotation and a depth of the 3D object based on a touch location and a touch type of the touch input with respect to the displayed 3D manipulation portion, wherein adjusting the rotation and the depth of the 3D object includes enlarging or reducing a size of the 3D object based on the touch type of the touch input and adjusting the depth of the 3D object based on a ratio of enlargement/reduction when the touch location of the touch input with respect to the displayed 3D manipulation portion is an outer region of the displayed 3D manipulation portion, and
   wherein the shape of the displayed 3D manipulation portion is same as a shape of the selected 3D object.

2. The method of claim 1, wherein the selected 3D object is one of an image, a picture, a widget, a text, an icon, or a graph.

3. The method of claim 1, wherein the displayed 3D manipulation portion has a shape of a circle, a band, or a ring.

4. The method of claim 1, wherein displaying the 3D manipulation portion includes displaying the 3D manipulation portion about a current 3D object, about an enlarged 3D object, or about a 3D object in a mini map.

5. The method of claim 1, further comprising increasing a size of the displayed 3D manipulation portion in response to each multi-tap input.

6. The method of claim 1, wherein on/off, color, size, thickness, form, depth or rotation angle of the displayed 3D manipulation portion are set based on input to a user menu displayed on the display.

7. The method of claim 1, wherein a form and a depth of the 3D object changes based on the touch location and the touch type of the touch input within the displayed 3D manipulation portion, and a shape, a color, or a depth of the displayed 3D manipulation portion changes to correspond to the changed form and depth of the 3D object.

8. The method of claim 1, wherein the touch location of the touch input with respect to the displayed 3D manipulation portion includes a touch to the displayed 3D manipulation portion or a touch to an outer region of the displayed 3D manipulation portion, and the touch type of the touch input with respect to the displayed 3D manipulation portion includes a single-touch & drag or a multi-touch & drag.

9. The method of claim 1, wherein adjusting the rotation and the depth of the 3D object comprises includes:
rotating or enlarging/reducing the 3D object based on the touch type of the touch input and adjusting the depth of the 3D object based on a ratio of enlargement/reduction when the touch location of the touch input with respect to the displayed 3D manipulation portion is the displayed 3D manipulation portion.

10. The method of claim 1, further comprising:
determining whether one or more setting values are stored in memory when the 3D object is selected;
applying the setting value to the 3D object when there exists only one stored setting value in the memory;
displaying, on the display, a plurality of candidate setting values when there exists more than one stored setting values in the memory; and
individually or collectively applying the setting values selected from the plurality of candidate setting values to the 3D object.

11. A mobile terminal comprising:
a display to display a perceived 3-dimensional (3D) object; and
a controller to receive a selection of a specific 3D object by one of a long touch, a double touch, or a 3D hot key & touch, and in response to the selection of the specific 3D object, to control the display to display a perceived 3D manipulation portion having a predetermined shape along the selected 3D object's edge, and the controller to adjust a rotation and a depth of the 3D object based on a touch location and a touch type of a touch input within the displayed 3D manipulation portion, wherein the controller to adjust the rotation and the depth of the 3D object includes enlarging or reducing a size of the 3D object based on the touch type of the touch input and adjusting the depth of the 3D object based on a ratio of enlargement/reduction when the touch location of the touch input with respect to the displayed 3D manipulation portion is an outer region of the displayed 3D manipulation portion, and
wherein the shape of the displayed 3D manipulation portion is same as a shape of the selected 3D object.

12. The mobile terminal of claim 11, wherein the selected 3D object is one of an image, a picture, a widget, a text, an icon, or a graph.

13. The mobile terminal of claim 11, wherein the controller controls the display to display the 3D manipulation portion to correspond to the displayed 3D object, and the displayed 3D manipulation portion has a shape of a circle, a band, or a ring.

14. The mobile terminal of claim 11, wherein the controller increases a size of the displayed 3D manipulation portion in response to each multi-tap input.

15. The mobile terminal of claim 11, wherein the controller controls a form and a depth of the 3D object to change based on the touch location and the touch type of the touch input within the displayed 3D manipulation portion, and a shape, a color, or a depth of the displayed 3D manipulation portion changes to correspond to the changed form and the changed depth of the 3D object.

16. The mobile terminal of claim 11, wherein the touch location of touch input within the displayed 3D manipulation portion includes a touch to the displayed 3D manipulation portion or a touch to an outer region of the displayed 3D manipulation portion, and the touch type of the touch input to the displayed 3D manipulation portion includes a single-touch & drag or a multi-touch & drag.

17. The mobile terminal of claim 11, wherein the controller rotates the displayed 3D object when part of the displayed 3D manipulation portion is single-touched and is then dragged in a predetermined direction based on a point of the 3D object.

18. The mobile terminal of claim 11, wherein the controller adjusts the depth of the displayed 3D object while enlarging or reducing the displayed 3D object when the displayed 3D manipulation portion is multi-touched or an outer region of the displayed 3D manipulation portion is multi-touched and is then widened or narrowed.

19. The mobile terminal of claim 11, wherein the controller determines whether a setting value exists in memory when the 3D object is selected and automatically applies the setting value to the 3D object when there exists only one stored setting value in the memory, and the controller displays a plurality of candidate setting values when more than one setting values are stored in the memory.

20. A method comprising:
displaying a perceived 3-dimensional (3D) object on a display of a mobile terminal;
receiving an object input, by one of a long touch, a double touch or a 3D hot key & touch, to select at least one perceived 3D object displayed on the display;
in response to receiving the object input by one of the long touch, the double touch, or the 3D hot key & touch, displaying, on the display, an editing indicator along the selected 3D object's edge, wherein the editing indicator is displayed while the 3D object is displayed on the display;
detecting a touch input with respect to the displayed editing indicator; and
changing an orientation and a depth of the displayed 3D object based on a location and a type of the detected touch input with respect to the displayed editing indicator, wherein changing the orientation and the depth of the displayed 3D object includes enlarging or reducing a size of the 3D object based on the touch type of the touch input and adjusting the depth of the 3D object based on a ratio of enlargement/reduction when the location of the touch input with respect to the displayed editing indicator is an outer region of the displayed editing indicator.

21. The method of claim 20, wherein the orientation includes one of a rotation, an enlargement, a reduction, a shape or a color of the displayed 3D object.

22. The method of claim 20, wherein the mobile terminal enters an editing mode of the 3D object in response to receiving the object input.

* * * * *